United States Patent [19]

Huther

[11] 4,416,621
[45] Nov. 22, 1983

[54] CERAMIC COMBUSTION CHAMBER AND METHOD OF MAKING IT

[75] Inventor: Werner Huther, Karlsfeld, Fed. Rep. of Germany

[73] Assignee: MTU Motoren-und Turbinen-Union Munchen GmbH, Munich, Fed. Rep. of Germany

[21] Appl. No.: 292,861

[22] Filed: Aug. 14, 1981

[30] Foreign Application Priority Data

Aug. 22, 1980 [DE] Fed. Rep. of Germany ....... 3031689

[51] Int. Cl.³ ............................................. F23D 15/02
[52] U.S. Cl. .................................... 431/352; 60/753; 110/336
[58] Field of Search ....................... 431/352, 190, 173; 110/336; 60/753

[56] References Cited

U.S. PATENT DOCUMENTS

| | | | |
|---|---|---|---|
| 1,637,064 | 7/1927 | Toffteen | 431/352 |
| 2,927,632 | 3/1960 | Fraser | 431/352 |
| 3,237,677 | 3/1966 | von Wiesenthal et al. | 431/190 |

FOREIGN PATENT DOCUMENTS 3900 9/1979 European Pat. Off. ............ 431/187

Primary Examiner—Carroll B. Dority, Jr.
Attorney, Agent, or Firm—Alan H. Levine

[57] ABSTRACT

A ceramic combustion chamber having air inlet ports and a double wall formation in the region of each inlet port. The two walls of the formation have a cavity between them which communicates with the inlet port. The double wall formation may be formed by an annular slot in the wall of the part. Alternatively, the double wall formation may be formed by two nested but spaced apart shells joined together at one end of the combustion chamber. The combustion chamber may be made by compressing ceramic powder in two steps to create a compact having an internal lost core or cores which are burned out, after which the ports are formed. Alternatively, the combustion chamber may be made by die casting ceramic powder around cores having the shape of the desired air inlet ports, after which the cores are burned out.

1 Claim, 9 Drawing Figures

CERAMIC COMBUSTION CHAMBER AND METHOD OF MAKING IT

This invention relates to a ceramic combustion chamber having air inlet ports, such as is used in, e.g., gas turbine engines. Such ceramic combustion chambers normally consist of $Si_3N_4$ or SiC. It has been found, however, that owing to the considerable temperature difference between the outer side of the combustion chamber and its inner side, especially in the inlet port areas, cracks develop that destroy the combustion chamber.

It is a broad object of the present invention to provide a combustion chamber of the type described in which the thermal stresses encountered are minimized.

It is a particular object of the present invention to provide a combustion chamber wherein, at the air inlet port zone, the combustion chamber wall is formed as a double wall having an intervening cavity.

A combustion chamber formed in accordance with the present invention causes thermal stresses to be considerably reduced, so that, as has in fact been shown, thermal cracks which would otherwise originate at the air inlet holes are prevented from occurring.

In a preferred embodiment of the present invention, the double wall is limited to the rim area of the air inlet ports and is formed by annular slots recessed into the rim.

With combustion chambers having very closely spaced air inlet ports, the double wall is preferably formed by two shells which are inserted one into the other leaving a space between them, the shells being joined together, to form a single piece, only at one end of the combustion chamber. Use can conceivably be made also of mixed configurations, in which individual partial areas of the combustion chamber wall are made of double wall configuration over their entire area, whereas in other partial areas annular slots are provided around the air inlet ports. The extent to which double walls are used varies with the mechanical and thermal stresses to be imposed on the combustion chamber.

Coordinately, the present invention also relates to methods for the manufacture of ceramic combustion chambers of the type described above.

Embodiments of combustion chambers in accordance with the present invention, and methods for their manufacture, are described more fully with reference to the accompanying drawings, which show schematic longitudinal cross-sectional views of combustion chambers, or of combustion chamber blanks, together with their associated molds. In the drawings.

Figure 1:
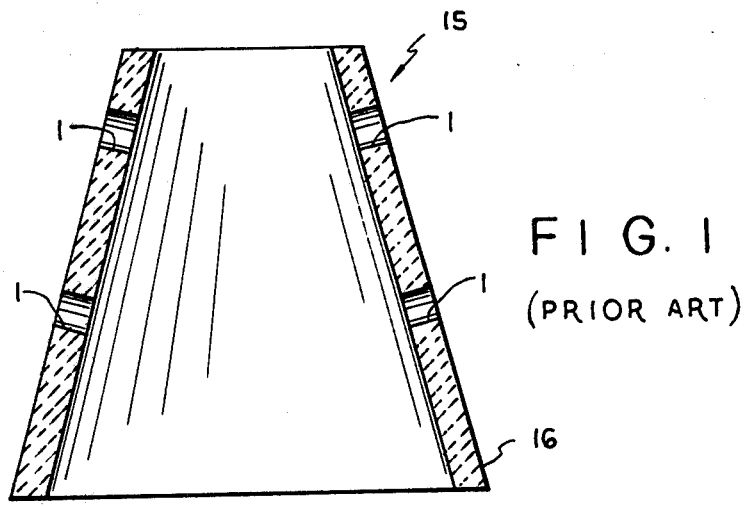
FIG. 1 illustrates a conventional combustion chamber.

With reference now to FIG. 1, the combustion chamber 15 shown in longitudinal cross-section has conventionally arranged air inlet ports 1 in the combustion chamber wall 16. Unlike FIG. 1, the combustion chamber 15' shown in FIG. 2 has a double wall in the air inlet port zone, the double wall being limited to the rim area of the air inlet ports 1' and formed by annular slots 17, recessed into the rim.

Figure 3:
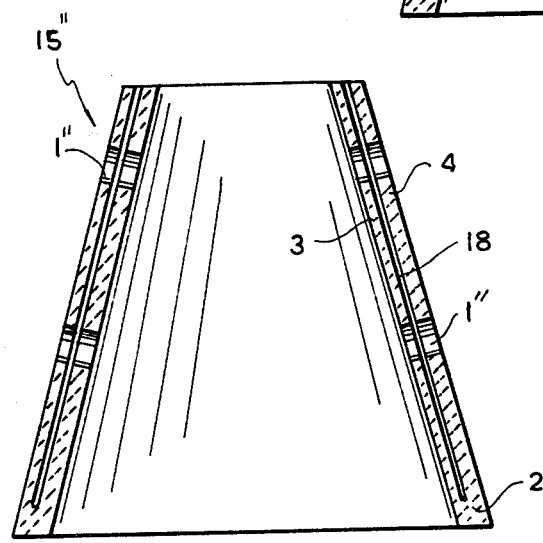
FIG. 3 illustrates an alternative embodiment of a combustion chamber in accordance with the present invention.

In the combustion chamber 15" of FIG. 3, the double wall extends over nearly the entire length of the combustion chamber. Two shells 3 and 4 are provided which are inserted one into the other with a space between them and joined one to the other, to form a single piece, only at one end 2 of the combustion chamber, the shells defining an air well 18 between them.

Figure 2:
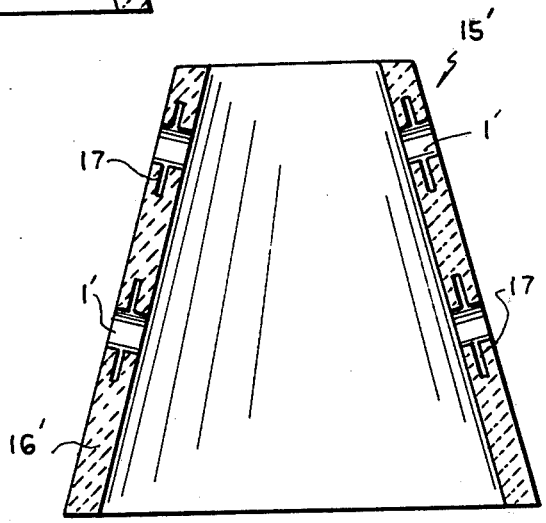
FIG. 2 illustrates a first embodiment of a combustion chamber in accordance with the present invention.

FIGS. 4 to 7 illustrate a first method, in accordance with the present invention, for the manufacture of the combustion chamber illustrated in FIG. 2 or FIG. 3. By this method, a green combustion chamber specimen is produced by isostatic pressing. In a first process step (FIG. 4), the starting powder 5' (Si metal powder, if the finished chamber will be $Si_3N_4$, or sinterable SiC powder provided with an organic binding agent) is placed into a compression mold consisting of a solid core 10 and a flexible cover 20, after which the mold is sealed and pressed under 100 to 1500 bar.

The resulting compact 5 is then taken from the mold, and lost cores 8 (FIG. 5), e.g., of paper or plastic, are cemented on to the exterior of the compact 5 in the areas where the finished combustion chamber is intended to be double-walled, i.e., where the wall 16' (FIG. 2) will have annular slots 17. Alternatively, instead of lost cores 8, larger lost cores or intermediate layers of paper or plastic material (not shown) are cemented to the exterior of compact 5 where the ultimate combustion chamber wall will have a well 18 (FIG. 3).

Figure 4:
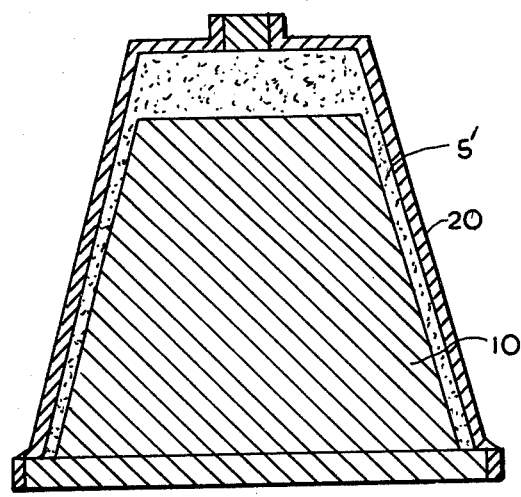
FIG. 4 illustrates a compression mold, having a removable cover, for forming the combustion chamber of FIG. 2.
Figure 5:
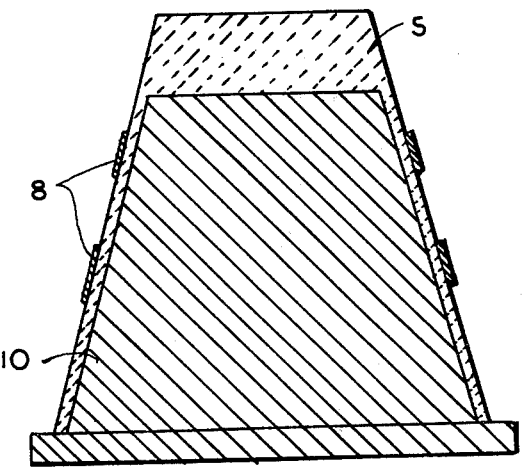
FIG. 5 illustrates the compression mold of FIG. 4, with the cover removed.
Figure 6:
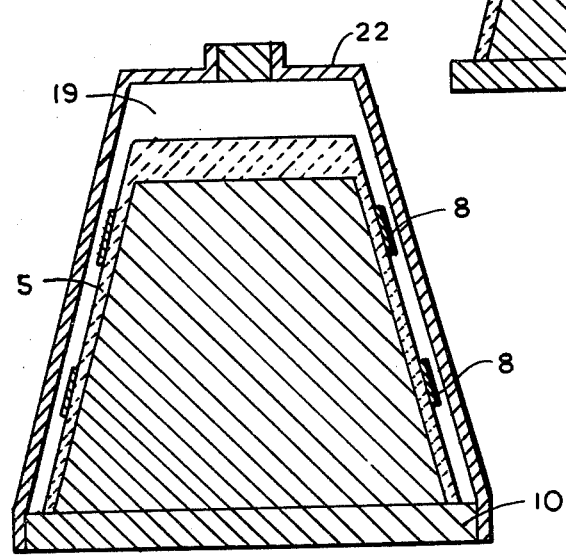
FIG. 6 illustrates another compression mold, similar to that of FIG. 4, but of somewhat larger size.

After having been conditioned in this manner, the compact 5 is then placed inside a second compression mold (FIG. 6), the core 10 of which can be the same as shown in FIG. 4 or FIG. 5, the flexible cover 22 of which, however, is larger than the cover 20 of FIG. 4 to allow for a still absent thickness of wall. After additional powder, which is the same as was used in the first process step, is placed into cavity 19, the mold is sealed and pressed under 1000 to 4000 bar. Due to the higher degree of compaction during the second pressing operation, the preformed inner compact intimately unites with the outer powder in the mold.

Figure 7:
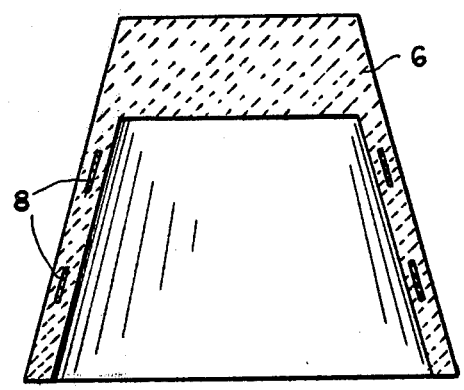
FIG. 7 illustrates a compact produced in the compression mold of FIG. 6.

The resulting compact 6 is illustrated in FIG. 7. Binding agents are then burned out from the ceramic powder at temperatures to about 600° C., while the cores 8 are simultaneously burned away or evaporated. Sintering then takes place at 1900° C. to 2300° C. in the case of SiC powder, or nitriding at 1100° C. to 1700° C. in an $N_2$ atmosphere. As a next step in the process, the air inlet ports 1', 1" are made in the double-walled areas of the combustion chamber wall by preferably ultrasonic, electro-erosive, or grinding process. The ports are of smaller diameter than the cores 8, so as to leave annular slots 17 around the ports. The resulting combustion chamber is finally subjected to a finishing machining operation as an only remaining step.

In order to facilitate formation of the air inlet ports it will be helpful to perform the sintering or nitriding operation in two stages, the first stage taking place before the air inlet ports are formed, and the second after. In this case, burning of the binding agent or core material is followed by initial sintering at 1400° C. to 1800° C. for a duration of 10 to 30 minutes, or pre-nitriding, when a silicon compact is used, at 1100° C. to 1300° C. for a duration of 10 minutes to 3 hours. This first sintering or nitriding operation is then followed by the formation of the air inlet ports and, thereafter, by finish sintering or nitriding, at the above-mentioned temperatures. This is followed by finish machining.

Figure 8:
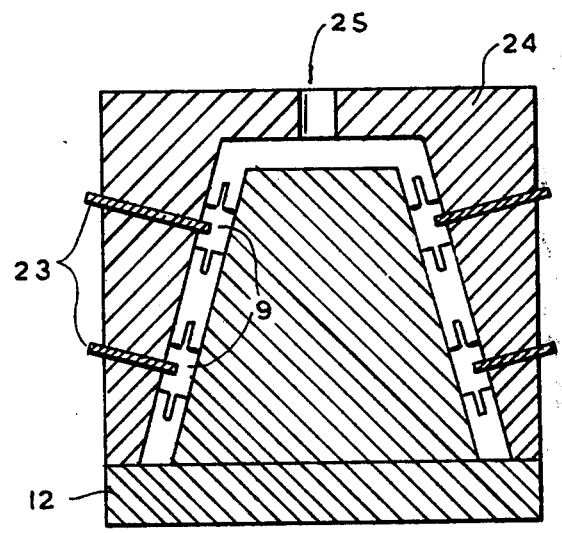
FIG. 8 illustrates a die casting mold for making a combustion chamber such as is illustrated in FIG. 2.
Figure 9:
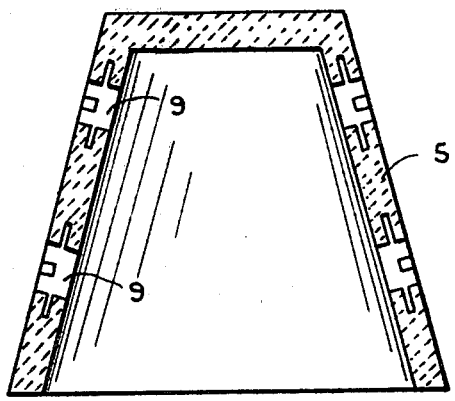
FIG. 9 illustrates a finished combustion chamber compact taken from the die mold of FIG. 8.

A second method in accordance with the present invention involves manufacturing the green combustion chamber work piece using the die casting process. In this method, the starting powder (Si or SiC), which is provided with a suitable temporary binding agent, is placed into a die casting mold (FIG. 8) including a movable member 12 and stationary member 24. A gate 25 is provided in the stationary mold member 24. In order to form the desired double wall, cores 9 consisting of a plastic material, such as polyethylene, cellulose or polystyrene, are inserted in the die casting mold. The cores are positioned, in the embodiment of FIG. 8, using axially moveable sliding members 23 which when the compound is being injected projecte into recesses in the cores 9. After initial drying, the green combustion chamber work-piece will be such that as described above, the binding agent and the core material are first burned out, after which sintering or nitriding takes place. After these process steps, finishing machining will be the only work still required, since the air inlet ports already exist.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

I claim:

1. A tubular ceramic combustion chamber wall having a plurality of air inlet ports each extending completely through the thickness of the wall, and a double wall formation extending around each of the inlet ports, the two walls of each formation being formed by an annular slot in the wall of its respective port, and the depth of each slot being at least equal to the thickness of the chamber wall.

* * * * *